United States Patent
Walters

(10) Patent No.: US 9,008,259 B2
(45) Date of Patent: Apr. 14, 2015

(54) SHEATHED, ANNULAR METAL NUCLEAR FUEL

(75) Inventor: Leon C. Walters, Idaho Falls, ID (US)

(73) Assignee: Advanced Reactor Concepts LLC, Idaho Falls, ID (US)

( * ) Notice: Subject to any disclaimer, the term of this patent is extended or adjusted under 35 U.S.C. 154(b) by 908 days.

(21) Appl. No.: 13/004,974

(22) Filed: Jan. 12, 2011

(65) Prior Publication Data

US 2011/0194666 A1 Aug. 11, 2011

Related U.S. Application Data

(60) Provisional application No. 61/294,673, filed on Jan. 13, 2010.

(51) Int. Cl.
| | |
|---|---|
| *G21C 3/06* | (2006.01) |
| *G21C 3/04* | (2006.01) |
| *G21C 3/60* | (2006.01) |
| *G21C 21/02* | (2006.01) |
| *G21C 3/00* | (2006.01) |

(52) U.S. Cl.
CPC .. *G21C 3/04* (2013.01); *G21C 3/06* (2013.01); *G21C 3/60* (2013.01); *G21C 21/02* (2013.01); *Y02E 30/38* (2013.01)

(58) Field of Classification Search
CPC .............. G21C 3/02; G21C 3/04; G21C 3/06; G21C 3/42; G21C 3/58; G21C 3/60; G21C 21/02; Y02E 30/30; Y02E 30/38
USPC ......... 376/409, 412, 414, 416, 417, 156, 158, 376/185, 418–420, 424, 426, 428–435, 438, 376/440, 451, 455, 456, 413, 457; 264/0.5; 419/1, 3
See application file for complete search history.

(56) References Cited

U.S. PATENT DOCUMENTS

| | | | |
|---|---|---|---|
| 1,624,704 A | | 4/1927 | Adams |
| 2,983,663 A | * | 5/1961 | Bassett .......................... 376/419 |
| 2,992,179 A | * | 7/1961 | Bassett .......................... 376/429 |
| 3,042,594 A | | 7/1962 | Hauth |
| 3,098,024 A | | 7/1963 | Barney et al. |

(Continued)

FOREIGN PATENT DOCUMENTS

| | | |
|---|---|---|
| GB | 1206776 | 9/1970 |
| JP | 50014318 | 5/1975 |

(Continued)

OTHER PUBLICATIONS

Herrmann et al, "Electrolytic Reduction of Spent Nuclear Oxide Fuel as Part of an Integral Process to Separate and Recover Actinides from Fission Products," *Separation Science and Technology*, 41: pp. 1965-1983, (2006).

(Continued)

*Primary Examiner* — Bernarr Gregory
(74) *Attorney, Agent, or Firm* — Porzio, Bromberg & Newman P.C.

(57) ABSTRACT

A sheathed, annular metal fuel system is described. A metal fuel pin system is described that includes an annular metal nuclear fuel alloy. A sheath may surround the metal nuclear fuel alloy, and a cladding may surround the sheath. A gas plenum may also be present. Mold arrangements and methods of fabrication of the sheathed, annular metal fuel are also described.

30 Claims, 2 Drawing Sheets

(56) References Cited

U.S. PATENT DOCUMENTS

| | | | |
|---|---|---|---|
| 3,178,354 A | 4/1965 | Vann et al. | |
| 3,197,375 A | 7/1965 | Borst | |
| 3,215,608 A | 11/1965 | Guenther | |
| 3,243,352 A * | 3/1966 | Boudouresques | 376/451 |
| 3,261,378 A | 7/1966 | Ayer et al. | |
| 3,322,509 A | 5/1967 | Vogg | |
| 3,328,133 A | 6/1967 | Ishihara et al. | |
| 3,409,973 A * | 11/1968 | Kilp et al. | 419/3 |
| 3,413,383 A | 11/1968 | Hirose et al. | |
| 3,420,738 A * | 1/1969 | Grant | 376/424 |
| 3,442,762 A | 5/1969 | Denton | |
| 3,677,894 A * | 7/1972 | Ferrari | 376/413 |
| 3,682,774 A | 8/1972 | Beyer | |
| 3,683,975 A | 8/1972 | Sease et al. | |
| 3,702,282 A * | 11/1972 | Gatley et al. | 376/420 |
| 3,708,393 A | 1/1973 | Waymire et al. | |
| 3,778,348 A * | 12/1973 | Sease et al. | 376/430 |
| 3,808,320 A | 4/1974 | Kaiser et al. | |
| 3,823,067 A * | 7/1974 | Stern et al. | 376/426 |
| 3,939,039 A | 2/1976 | Seki et al. | |
| 400,617 A | 1/1977 | Fortescue | |
| 4,004,972 A | 1/1977 | Mogard | |
| 4,050,638 A | 9/1977 | Ito et al. | |
| 4,057,465 A | 11/1977 | Thompson et al. | |
| 4,131,511 A * | 12/1978 | Mordarski et al. | 376/418 |
| 4,147,590 A | 4/1979 | Szekely | |
| 4,225,560 A | 9/1980 | Nakanishi et al. | |
| 4,229,942 A | 10/1980 | Gomberg et al. | |
| 4,257,846 A | 3/1981 | Pierce | |
| 4,257,847 A * | 3/1981 | Gibby et al. | 376/418 |
| 4,292,127 A | 9/1981 | Hartley et al. | |
| RE31,697 E | 10/1984 | Gomberg et al. | |
| 4,526,741 A * | 7/1985 | Cawley et al. | 376/435 |
| 4,610,842 A * | 9/1986 | Vannesjo | 376/416 |
| 4,624,828 A | 11/1986 | Alexander | |
| 4,687,629 A * | 8/1987 | Mildrum | 376/428 |
| 4,717,534 A | 1/1988 | Morita | |
| 4,759,911 A * | 7/1988 | Bingham et al. | 376/428 |
| 4,814,046 A | 3/1989 | Johnson et al. | |
| 4,853,177 A * | 8/1989 | Pettus | 376/418 |
| H689 H | 10/1989 | Christiansen et al. | |
| 4,943,409 A | 7/1990 | Broadley | |
| 4,997,596 A | 3/1991 | Proebstle et al. | |
| 5,044,911 A | 9/1991 | Seidel et al. | |
| 5,112,534 A | 5/1992 | Guon et al. | |
| 5,196,159 A | 3/1993 | Kawashima et al. | |
| 5,219,519 A | 6/1993 | Matzner | |
| 5,257,659 A | 11/1993 | Maag | |
| 5,317,611 A * | 5/1994 | Petrosky et al. | 376/433 |
| 5,377,246 A | 12/1994 | Taylor, Jr. et al. | |
| 5,400,375 A | 3/1995 | Suzuki et al. | |
| 5,419,886 A | 5/1995 | Grantham et al. | |
| 5,446,773 A | 8/1995 | Wakabayashi | |
| 5,502,754 A | 3/1996 | Erbes | |
| 5,517,541 A | 5/1996 | Rosenbaum et al. | |
| 5,519,748 A * | 5/1996 | Adamson et al. | 376/457 |
| 5,608,768 A * | 3/1997 | Matzner et al. | 376/451 |
| 5,681,404 A | 10/1997 | Adamson et al. | |
| 5,711,826 A | 1/1998 | Nordstrom | |
| 5,742,653 A | 4/1998 | Erbes et al. | |
| 5,828,715 A | 10/1998 | Kurosaki et al. | |
| 6,091,791 A | 7/2000 | Matsumoto et al. | |
| 6,113,982 A | 9/2000 | Claar et al. | |
| 6,233,298 B1 | 5/2001 | Bowman | |
| 6,251,310 B1 | 6/2001 | Song et al. | |
| 6,263,038 B1 | 7/2001 | Kantrowitz et al. | |
| 6,298,108 B1 | 10/2001 | Farawila | |
| 6,343,107 B1 | 1/2002 | Erbes et al. | |
| 6,668,034 B2 | 12/2003 | Mahe | |
| 6,674,830 B2 | 1/2004 | Kato et al. | |
| 6,768,781 B1 | 7/2004 | Moriarty | |
| 6,888,910 B1 | 5/2005 | Moriarty | |
| 7,445,760 B2 | 11/2008 | Fukasawa et al. | |
| 7,521,007 B1 | 4/2009 | Jarvinen et al. | |
| 7,711,079 B2 * | 5/2010 | Oh et al. | 376/440 |
| 7,961,835 B2 | 6/2011 | Keller | |
| 8,268,204 B2 * | 9/2012 | Rhee et al. | 264/0.5 |
| 8,537,961 B2 | 9/2013 | Keller | |
| 8,571,167 B2 | 10/2013 | Walters | |
| 2001/0007584 A1 | 7/2001 | Adamson et al. | |
| 2002/0117093 A1 | 8/2002 | Stamps | |
| 2005/0074083 A1 | 4/2005 | Haasbroek et al. | |
| 2007/0280400 A1 | 12/2007 | Keller | |
| 2007/0290178 A1 | 12/2007 | Baron et al. | |
| 2008/0144762 A1 | 6/2008 | Holden et al. | |
| 2009/0080586 A1 | 3/2009 | Yokoyama et al. | |
| 2010/0303193 A1 | 12/2010 | Walters | |
| 2011/0206173 A1 | 8/2011 | Walters | |
| 2014/0064432 A1 | 3/2014 | Walters | |

FOREIGN PATENT DOCUMENTS

| | | |
|---|---|---|
| JP | 60181694 | 9/1985 |
| JP | 02184792 | 7/1990 |
| JP | 06194477 | 7/1994 |
| JP | 07294676 | 11/1995 |
| JP | 09033687 | 2/1997 |
| JP | 09043389 | 2/1997 |
| JP | 09043391 | 2/1997 |
| JP | 09119994 | 5/1997 |
| JP | 2008170252 | 7/2008 |
| WO | WO-2010/141218 | 12/2010 |
| WO | WO-2011/088116 | 7/2011 |
| WO | WO-2011/142869 | 11/2011 |

OTHER PUBLICATIONS

Kosaka et al, "A Study on Fission Products Removal by the Dry Pyrochemical Technique for the Fuel Decladding," *Proceedings of Global 2005*, paper 199, Tsukuba, Japan, Oct. 2005.

Song et al, "Fractional Release Behavior of Volatile and Semivolatile Fission Products During a Voloxidation and OREOX Treatment of Spent PWR Fuel," *Nuclear Technology*; 162: 158-168, May 2008.

Thomas, "AIROX Nuclear Fuel Recycling and Waste Management," *Proceedings of Global 93*, 2: 722-728, Seattle WA, Sep. 1993.

Ogata et al., "Directions of Metal Fuel Development for Fast Reactors," *Proceedings of Global 2009*, paper 9135, Paris, France, pp. 1456-1464; Sep. 6-11, 2009.

International Search Report and Written Opinion for related application PCT/US10/35412, mailed Aug. 31, 2010.

International Search Report and Written Opinion for related application PCT/US2011/020981, mailed Mar. 23, 2011.

In the U.S. Patent and Trademark Office, Notice of Allowance in re: U.S. Appl. No. 12/696,851, dated Aug. 22, 2013, 6 pages.

In the U.S. Patent and Trademark Office, Final Office Action in re: U.S. Appl. No. 12/696,851, dated Jun. 6, 2013, 8 pages.

In the U.S. Patent and Trademark Office, Office Action in re: U.S. Appl. No. 12/696,851, dated Dec. 21, 2012, 9 pages.

In the U.S. Patent and Trademark Office, Requirement for Restriction/Election in re: U.S. Appl. No. 12/696,851, dated Aug. 29, 2012, 9 pages.

In the U.S. Patent and Trademark Office, Notice of Allowance in re: U.S. Appl. No. 13/030,740, dated Mar. 14, 2014, 9 pages.

In the U.S. Patent and Trademark Office, Office Action in re: U.S. Appl. No. 13/030,740, dated Sep. 20, 2013, 5 pages.

"Innovative small and medium sized reactors: Design features, safety approaches and R&D trends," *International Atomic Energy Agency*, [online], May 2005, pp. 1-214 [retrieved on Nov. 11, 2011) Retrieved from the Internet: <URL: http://www-pub.iaea.org/MTCD/publications/PDF/te_1451_web.pdf>.

Cha et al., "Development of a Supercritical CO2 Brayton Energy Conversion System Coupled with a Sodium Cooled Fast Reactor," *Nuclear Engineering and Technology*, [online] Oct. 2009: 41(8), pp. 1025-1044 [retrieved on Nov. 11, 2011] Retrieved from the Internet: <URL: http://article.nuclear.or.kr/jknsfile/v41/JK0411 025.pdf>.

Chang et al., "Small Modular Fast Reactor Design Description," *Argonne National Laboratory*, Jul. 2005, 194 pages.

International Search Report and Written Opinion for related International Application No. PCT/US2011/025455, dated Nov. 25, 2011, 11 pages.

(56) References Cited

OTHER PUBLICATIONS

Kadak et al., "Nuclear Power Plant Design Project: A Response to the Environmental and Economic Challenge of Global Warming Phase 1 Review of Options & Selection of Technology of Choice," *Massachusetts Institute of Technology Independent Activities Period*, [online], Jan. 1998, 56 pages [retrieved on Nov. 10, 2011] Retrieved from the Internet: <URL: http://web.mit.edu/pebble-bed/background.pdf>.

Nuclear Power Technology Development, "Coordinated Research Project CRP 125001 Small Reactors without On-Site Refuelling (2004-2008)" International Atomic Energy Agency, [online], Updated on Oct. 15, 2008, pp. 1-12 [retrieved on Nov. 10, 2011]. Retrieved from the Internet: <URL: http://www.iaea.org/NuclearPower/SMR/crpi25001.html>.

* cited by examiner

SHEATHED, ANNULAR METAL NUCLEAR FUEL

CROSS REFERENCE TO RELATED APPLICATION

The present invention claims priority to U.S. Provisional Patent Application No. 61/294,673, filed Jan. 13, 2010; the content of which is incorporated herein by reference in its entirety.

TECHNICAL FIELD OF THE INVENTION

The present invention is related to nuclear fuels, and, more particularly, to metal nuclear fuel.

BACKGROUND OF THE INVENTION

World electricity demand is expected to double by 2030 and quadruple by 2050. The world electricity demand increase is forecasted to come from developed countries and, to an even larger extent, developing countries. To meet this rapid growth in demand, nuclear power may be a realistic, cost-effective energy source.

Increased energy supply from other sources, such as contribution from natural gas powered generation may be constrained by high and volatile gas prices, greenhouse gas emissions, and concerns over longer-term dependence on unstable sources of supply. Meanwhile, forms of alternative energy (solar, wind, biomass, hydroelectric, etc.) may be useful in satisfying some of the increased demand. They do not, however, scale sufficiently and cannot provide enough additional electric generating capacity in most markets to meet any significant part of the new electricity demand.

Coal power plants may provide some additional supply, but burning mass quantities of coal presents serious political obstacles given the negative environmental impacts.

Conventional nuclear power plants may also meet part of the added demand. Conventional nuclear power plants, however, have obstacles to overcome. New types of nuclear fuels may be required.

SUMMARY OF THE INVENTION

A description of a novel nuclear power plant is found in U.S. Non-Provisional patent application Ser. No. 12/696,851, filed Jan. 29, 2010, and PCT Patent Application No. PCT/US2010/035412, filed May 19, 2010; the contents of which are incorporated by reference herein in their entireties.

A sheathed, annular metal fuel system is described. A metal fuel pin system is described that includes an annular metal nuclear fuel alloy. A sheath may surround the metal nuclear fuel alloy, and a cladding may surround the sheath. A gas plenum may also be present. Mold arrangements and methods of fabrication of the sheathed, annular metal fuel are also described.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF CERTAIN EMBODIMENTS

Embodiments of the present invention may include sheathed, annular metal nuclear fuels, mold arrangements for sheathed, annular metal nuclear fuels, and methods for fabrication of sheathed, annular metal nuclear fuels.

In certain embodiments, several fabrication techniques may be used separately and/or individually to create the sheathed, annular metal nuclear fuels. For example, fabrication of annular metal fuels may be performed by bottom pour casting of a solid slug of metal fuel into a zirconium or similar type of tube in a graphite mold.

Embodiments of the present invention may include fabrication and irradiation of an annular metal fuel slug with a zirconium sheath that is fit tightly to a cladding, which may be steel, with a helium bond. This combination can provide a number of important attributes that each feature, when taken individually, would not.

Fabrication Process

Figure 1:
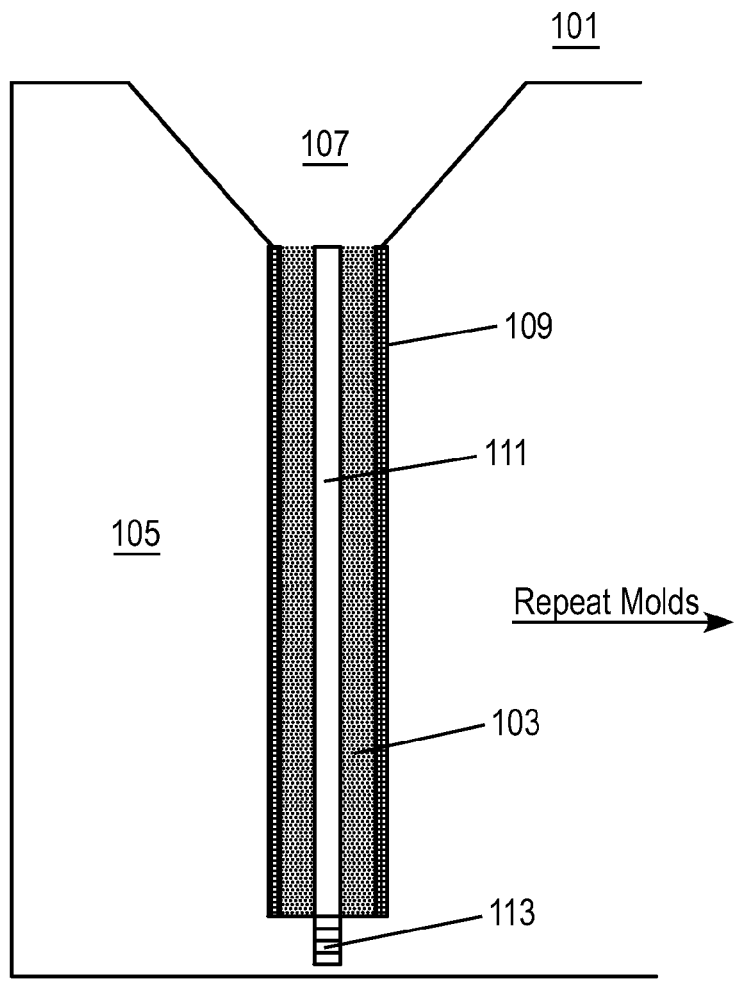
FIG. 1 shows a liquid alloy bottom poured from a crucible into a graphite mold, according to one embodiment.

FIG. 1 shows a mold arrangement 101 for bottom pour casting according to one embodiment. The following are beneficial attributes of bottom pour casting when compared to the traditional technique of metal fuel fabrication by injection casting:

a. Graphite molds are reusable, which eliminates the waste produced with fuel particles stuck to the quartz molds from injection casting.

b. The range of alloy compositions is not limited, as with injection casting where softening of the quartz molds during casting limits the maximum melting temperature of the alloy that can be cast.

c. Annular slugs can be cast where annular geometry is not practical with injection casting.

d. The inclusion of a sheath is practical with bottom pore casting.

e. The elimination of volatile element loss is possible with bottom pour casting by use of over-pressure of an inert gas.

f. Bottom pour casting lends itself to remote application.

Metal fuel 103 may be melted in a graphite or similar type crucible with a small over pressure of an inert gas to minimize volatile component loss. The metal alloy may be uranium-zirconium, uranium-molybdenum, with or without the additions of plutonium and other transuranic elements.

Thorium based alloys may also be fabricated in such a manner. Embodiments of the present invention may accommodate metallic thorium alloy fuel. There is renewed interest in the use of thorium alloy fuels, particularly in countries, such as India, that do not have an indigenous inventory of uranium. Results of early research in the United States showed that thorium metal fuels, when irradiated, exhibited interconnected porosity and gas release, in a manner similar to the traditional uranium alloy fuels. As such, embodiments of the present invention may utilize thorium based alloys in fuel pins and/or fabrication techniques for improved performance of thorium-based fuels.

Tight tolerances are unnecessary with metal fuels due to the low smear density and plastic properties of the fuel when under irradiation. The range of alloy compositions should not be as limited as in the case of injection cast fuel where the softening of quartz molds was a limitation. The liquid alloy metal fuel 103 may be bottom poured from the crucible into a graphite mold or block 105, as shown on FIG. 1. The graphite mold 105 may include one or more cylindrical holes 107 lined with zirconium tubes 109. The tubes 109 may be refractory metal tubes other than zirconium. In an approximate center of each tube 109 may be a steel rod or a threaded solid graphite rod 111. The steel rod or a threaded solid graphite rod 111 may be coated with a thin ceramic layer, such as titanium nitride. Other ceramics may also be used. The steel rod or a threaded solid graphite rod 111 may be threaded 113 into the graphite mold 105. After the metal fuel 103 is cast into the graphite mold 105, a product removed from the graphite mold 105 may be an annular fuel slug, with a central hole, and a zirconium sheath.

The fabrication technique of embodiments of the present invention can produce significantly less waste compared to the past method of injection casting where the fuel material often stuck to quartz molds. Furthermore, the residual heel in the bottom of the crucible with bottom pour casting can be minimized compared to that found with injection casting.

An alternative to casting into a mold with a zirconium tube in the mold is to place a thin zirconium tube or a tube of a refractory alloy into the cladding with a reasonably tight fit and then put the annular fuel slug into the cladding with the zirconium tube already in place. A potential advantage with this method is that the zirconium tube may be continuous for a long core length in the event that the fuel slug casting length is limited. Fuel slugs could be stacked on one another without a discontinuity in the sheath. A helium gas bond may also be used to create an adequate heat transfer path during early stages of irradiation.

Figure 2:
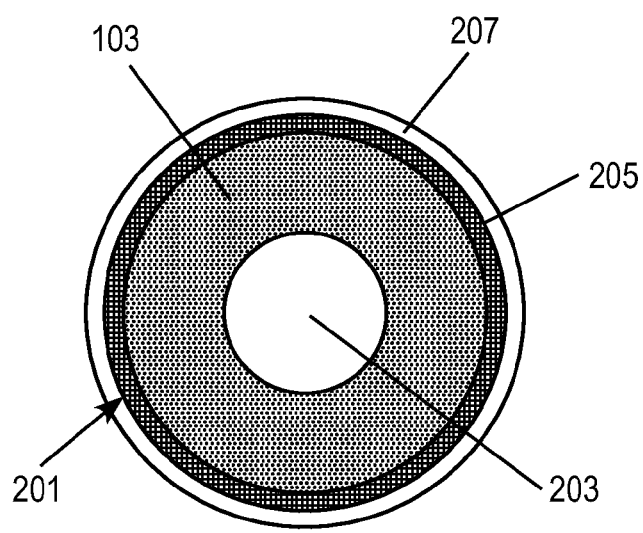
FIG. 2 shows a cross-section of an exemplary annular fuel slug with a central hole and zirconium sheath.

FIG. 2 shows a cross-section of an annular fuel slug/pin 201 with a central hole 203 and zirconium sheath 205, according to one embodiment. A steel or other similar material cladding jacket 207 may surround the zirconium sheath 205 and annular fuel slug 201. The zirconium sheath 205 may be used to provide a barrier between the annular fuel slug 201 and the cladding 207 at the very high residence times that are proposed for certain reactors. The dimensions of the annular fuel slug 201 and sub-components thereof may be varied based upon specific uses.

Inclusion of the zirconium sheath 205 in a fuel pin 201 may provide a method to protect the steel cladding 207 from chemical attack during the extremely long irradiation exposures for fast reactor fuels. During irradiation, elements in the metal fuel 103 interchange by diffusion with elements in the cladding 207 material such that the useful thickness of the cladding 207 diminishes, which can possibly lead to cladding rupture. A zirconium sheath 205 may retard this exchange of elements by diffusion. Other types of sheath materials may not provide this protection.

Another issue of concern is that a low-melting alloy may form at the interface between the fuel 103 and cladding 207 from either of two phenomena. First, iron in the cladding 207 may alloy with the fuel elements, for example uranium, and form a low melting composition. Second, lanthanide fission products may migrate to the fuel cladding interface and form a low melting alloy. A low melting alloy next to the cladding 207 can likely cause premature rupture. In either case, the zirconium sheath 205 may prevent the formation of the low melting alloys. Other types of sheath materials may not provide this protection.

Figure 3:
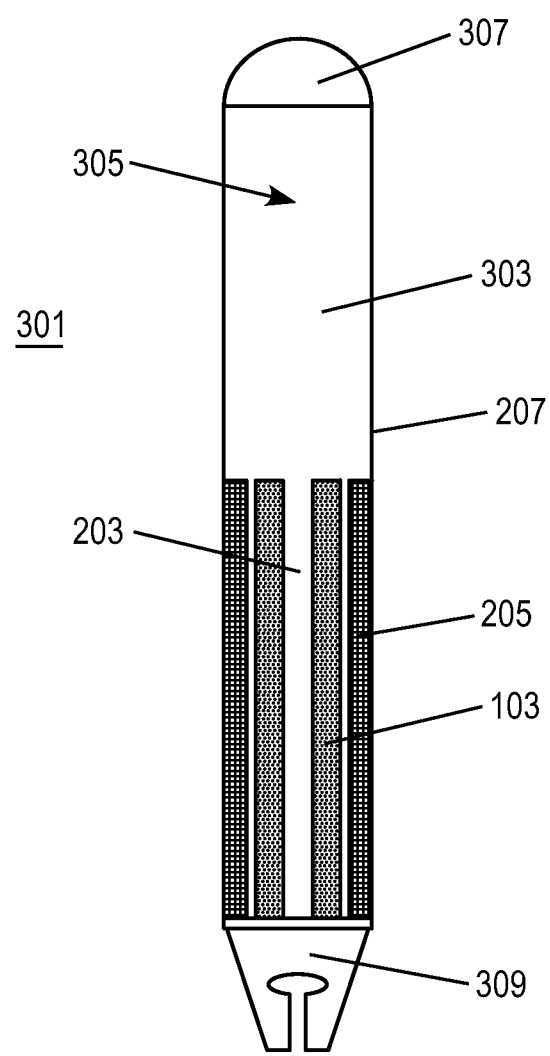
FIG. 3 shows an exemplary completed annular fuel slug with a zirconium sheath that is then put into a cladding jacket.

FIG. 3 shows a sheathed, annular metal fuel system 301, according to one embodiment. The annular fuel slug 201 with the zirconium sheath 205 may be placed into the cladding jacket 207. Tolerances on the annular fuel slug 201 may be such that the fit in the cladding 207 leaves little gap. A gas plenum 303 in the cladding jacket 207 may be filled with helium gas 305 to create adequate heat transfer. An end cap 307 and/or a bottom spade 309 may also be included in the sheathed, annular metal fuel system 301.

Purpose of the Fabrication Process

Traditional metal fuel can yield high burnup because a gap between fuel and cladding can allow the fuel to swell unimpeded from fission gas accumulation until the fission gas bubbles interconnect and the fission gas is released to the plenum above the fuel. The gap between fuel and cladding in the traditional metal fuel can result in an effective density of 75% or less. As such, interconnection of the gas pores may occur before the metal fuel reaches the cladding.

Instead of a gap between fuel and cladding as in traditional metal fuels, an effective fuel density of 75% or less may also be achieved by a central hole in the fuel slug. Thus, the fuel at least in part swells inward instead of outward to achieve interconnected porosity. With traditional metal fuels there may be significant axial growth of the metal fuel prior to cladding contact. In embodiments of the present invention, the annular fuel slug may be in contact with the sheath and cladding at the beginning of life and thus the axial growth may be much less than that of traditional metal fuels.

When uranium-zirconium or uranium-plutonium-zirconium fuel pins of traditional metal fuels are irradiated, the zirconium may tend to diffuse to the surface of the fuel slug and form a protective barrier between the fuel and the cladding. The zirconium layer formed by this diffusion mechanism is not always uniform and, thus, protection between fuel and cladding may be intermittent. In previous systems, metal fuel was injection cast into zirconium tubes as a technique to eliminate quartz molds, based on the prior art belief that the zirconium tubes would provide a protective barrier between fuel and cladding. In traditional systems, the fuel slug, along with the zirconium tube, was placed into a cladding with a sodium bond and irradiated. The gap between the fuel slug and the cladding was large for the 75% effective fuel density. When the fuel swelled the zirconium tube could split. Consequently, the tube did not function effectively as a protective barrier.

In embodiments of the present invention, the annular fuel slug with the zirconium sheath may be tightly fit into the cladding tube. Thus, when the annular fuel slug swells there may be little outward motion of the fuel as the annular fuel slug may swell toward the center. Consequently, the zirconium tube is not as likely to fracture and can remain intact as a protective barrier.

Furthermore, since there is little gap between the annular fuel slug and cladding, a liquid sodium bond may be unnecessary. Helium gas may also be used as a preferred heat transfer medium, but other materials may also be used. In traditional metal fuels, the sodium bond, after low burnup, may be squeezed into the plenum. With the helium bond, sodium filling of the cladding tubes and bond inspection can be eliminated. With no sodium bond, the length of the fuel pin may be substantially reduced. A shorter fuel pin may result in a shorter assembly and consequently a smaller reactor vessel, with significant cost saving.

Sodium bonded metal fuel typically must be heated from the top downward to liquefy the bond sodium before the fuel pins can be introduced into the reactor pool of sodium. This may require a special fuel loading machine. Also, for certain reactors, the entire core may be loaded as several cassettes. Heating these cassettes from the top down can require large and special equipment. Embodiments of the present invention seek to avoid these issues. Furthermore, elimination of sodium bonding opens the opportunity to ship and store fuel assemblies, after cleaning, with water cooling.

Embodiments of the present invention may also include systems and methods for generating energy using the sheathed, annular metal fuels. The sheathed, annular metal fuels may be irradiated to generate energy.

In embodiments of the present invention, volatile component loss, such as americium, may not be an issue because a small overpressure when melting the alloy may eliminate loss.

The radioactive elements in spent nuclear fuel are the fission products, with some elements having relatively short half-lives and the minor actinides having very long half-lives. As such, the minor actinides dictate the duration that a repository must be proven reliable because of the residual radioactivity. Also, the minor actinides fix the capacity of the repository due to the heat generated from the decay of the minor actinides. The pyro-process for the reprocessing of nuclear fuel, both ceramic and metal, removes the minor actinides from the spent fuel and the minor actinides are then used to alloy with new metal fuel. Metal fuel is an ideal host for the minor actinides.

The traditional method for the fabrication of metal fuel is by injection casting, which depends upon evacuating the system prior to the high-temperature injection of the molten alloy into quartz molds. The minor actinide americium is very volatile and thus is difficult to keep in the liquid phase during the evacuation process. The bottom pour casting method, detailed in this patent, does not require evacuation and in fact an overpressure of inert gas may be used to substantially eliminate the loss of americium during the casting process.

The present invention may allow for ease of remote fabrication in a hot-cell environment where the reprocessed fuel is highly radio active. The fabrication technique may be well-suited for the remote fabrication of reprocessed fuel. Eventually, most, if not all nuclear reactors will operate on reprocessed fuel. Reprocessed fast reactor fuel must be processed and fabricated in a remote environment, such as a hot cell. The technique for fuel fabrication must utilize equipment that is compact and readily maintainable in a hot cell. The bottom pour casting method for the fabrication of metal fuel is ideal in this regard for remote utilization.

In certain embodiments, the fuel may appear as traditional metal fuel after initial irradiation and thus the large data base for traditional fuel may be applicable. For example, when annular metal fuel is irradiated the fuel will swell into the annulus. When the diameter of the annulus is sized such that the smear density in the fuel, when the annulus closes due to fuel swelling, is 75% or less, then interconnected porosity and fission gas release occurs. Furthermore, the microstructure of the fuel then appears as that of a traditional metal fuel.

It is important that interconnected porosity and an identical microstructure to that of traditional metal fuel occur in the annular fuel because then a bridge can be established to the extensive data base for traditional metal fuel. As such, an extensive and expensive development program can be avoided for the licensing of annular fuel.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

What is claimed is:

1. A metal fuel pin system for a nuclear reactor, the system comprising:
   an annular metal nuclear fuel alloy, wherein a central hole provides for an effective fuel density of 75% or less upon irradiation;
   a zirconium sheath surrounding and fit tightly to the metal nuclear fuel alloy;
   a cladding surrounding the sheath; and
   a gas plenum.

2. The system of claim 1, wherein the metal nuclear fuel alloy comprises uranium-zirconium.

3. The system of claim 1, wherein the metal nuclear fuel alloy comprises uranium-molybdenum.

4. The system of claim 1, wherein the metal nuclear fuel alloy comprises transuranic elements.

5. The system of claim 1, wherein the metal nuclear fuel alloy comprises thorium alloys.

6. The system of claim 1, wherein the gas plenum is filled with helium.

7. The system of claim 1, wherein the cladding is steel.

8. The system of claim 1, wherein the metal nuclear fuel alloy acts like a traditional metal fuel upon irradiation.

9. The system of claim 1, wherein the metal nuclear fuel alloy is cast into the zirconium sheath to form a unitary product.

10. A metal fuel mold system comprising:
    a mold block with a cylindrical hole for receiving metal nuclear fuel alloy;
    a central rod within the cylindrical hole; and
    a zirconium sheath lining the cylindrical hole.

11. The system of claim 10, wherein the mold block comprises graphite.

12. The system of claim 10, wherein the central rod comprises steel coated with titanium nitride or a threaded solid graphite rod.

13. The system of claim 10, wherein the metal nuclear fuel alloy comprises uranium-zirconium.

14. The system of claim 10, wherein the metal nuclear fuel alloy comprises uranium-molybdenum.

15. The system of claim 10, wherein the metal nuclear fuel alloy further comprises transuranic elements.

16. The system of claim 10, wherein the metal nuclear fuel alloy comprises thorium alloys.

17. The system of claim 10, wherein the system is adapted for bottom pour casting.

18. A method of fabricating a sheathed, annular metal nuclear fuel, the method comprising:
    bottom pouring a liquid metal nuclear fuel alloy into a mold, wherein the mold comprises a set of holes within the mold, a rod in the approximate center of each of the holes, and a zirconium sheath within each of the one or more holes;
    allowing the liquid metal nuclear fuel alloy to form a sheathed, annular metal fuel;
    removing the sheathed, annular metal fuel; and
    placing the sheathed, annular metal fuel in a cladding with a gas plenum.

19. The method of claim 18, wherein the one or more tubes are placed into a cladding prior to bottom pouring.

20. The method of claim 18, wherein the rod is a titanium nitride coated steel rod or a threaded solid graphite rod.

21. The method of claim 18, wherein the metal nuclear fuel alloy comprises uranium-zirconium.

22. The method of claim 18, wherein the metal nuclear fuel alloy comprises uranium-molybdenum.

23. The method of claim 18, wherein the metal nuclear fuel alloy comprises transuranic elements.

24. The method of claim 18, wherein the metal nuclear fuel alloy comprises thorium alloys.

25. The method of claim 18, further comprising remote fabrication of reprocessed fuel.

26. A method of using an annular metal fuel slug, the method comprising:
   providing an annular metal fuel slug created by bottom pour casting;
   initially irradiating of the annular metal fuel slug; and
   wherein the annular metal fuel slug acts like a traditional metal fuel after initial irradiation.

27. The method of claim 26, further comprising remote fabrication of reprocessed fuel.

28. The method of claim 26, further comprising removing minor actinides from spent fuel and alloying the minor actinides with new metal fuel.

29. The method of claim 26, further comprising providing a zirconium sheath surrounding the annular metal fuel slug.

30. The method of claim 26, wherein the annular metal fuel slug comprises thorium alloys.

\* \* \* \* \*